J. N. JOHNSON.
SELF LEVELING REPEATING CAMERA.
APPLICATION FILED JUNE 20, 1912.
1,083,743.
Patented Jan. 6, 1914.
2 SHEETS—SHEET 2.
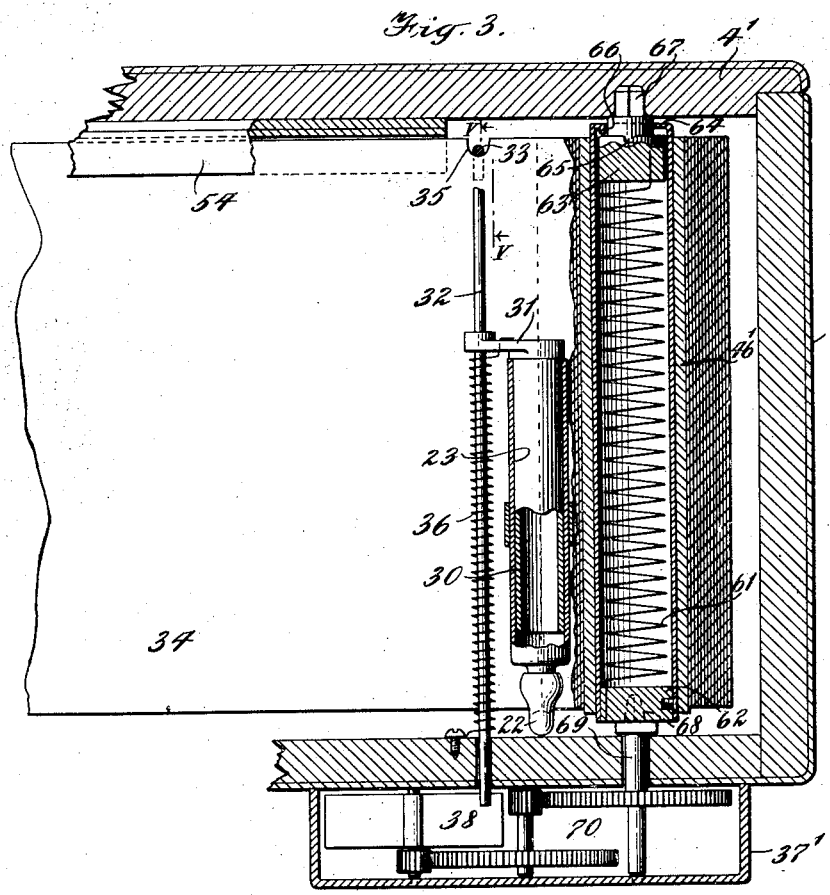
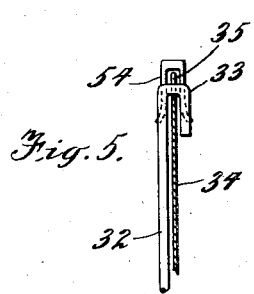
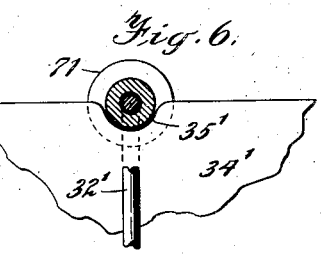
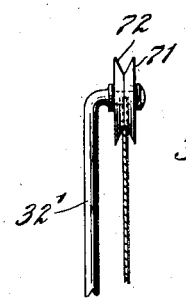
Witnesses:
Inventor
John N. Johnson
By his Attorneys

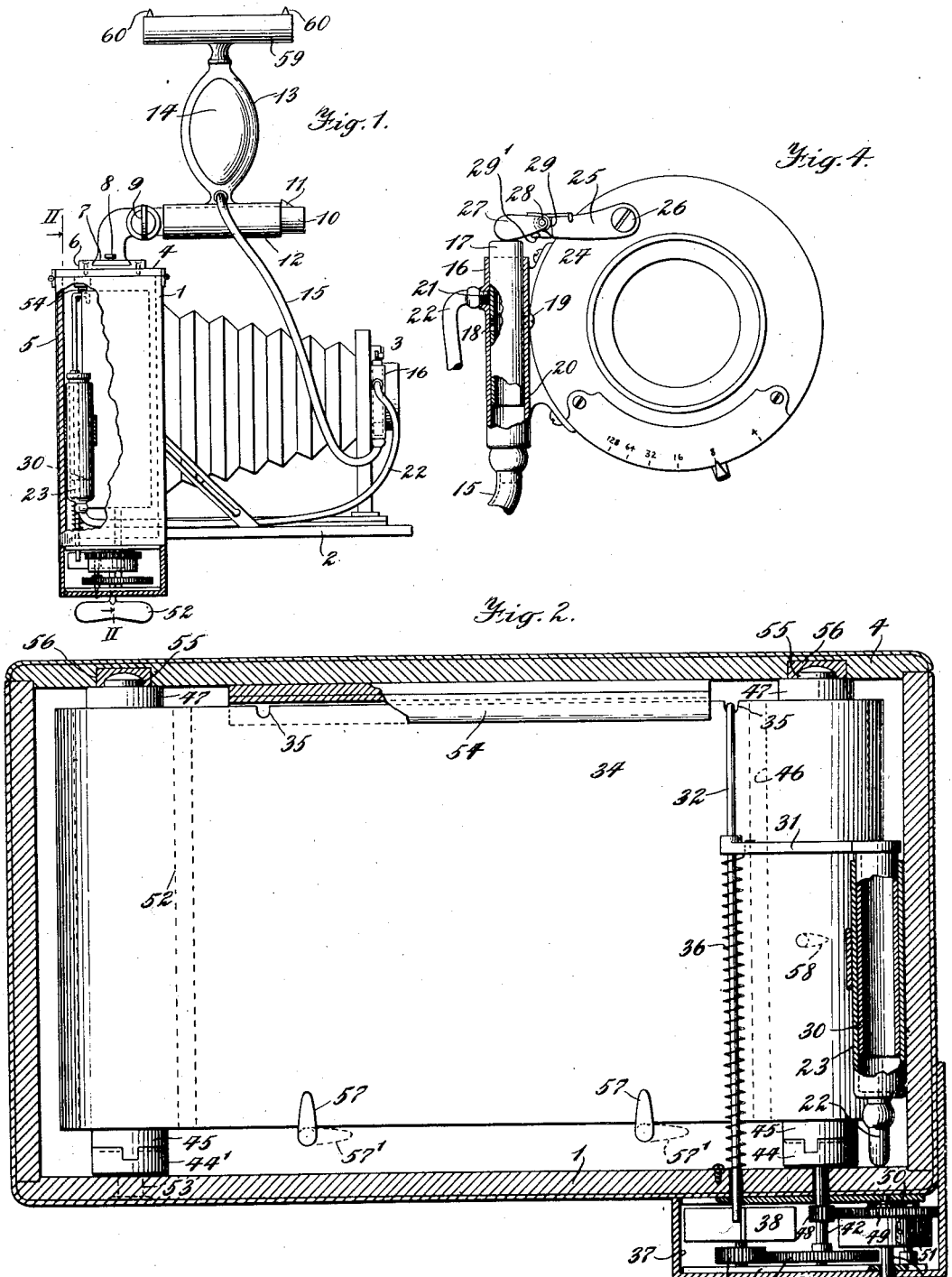
J. N. JOHNSON.
SELF LEVELING REPEATING CAMERA.
APPLICATION FILED JUNE 20, 1912.
1,083,743.
Patented Jan. 6, 1914.
2 SHEETS—SHEET 1.

UNITED STATES PATENT OFFICE.

JOHN N. JOHNSON, OF ALBUQUERQUE, NEW MEXICO.

SELF-LEVELING REPEATING CAMERA.

1,083,743.

Specification of Letters Patent.

Patented Jan. 6, 1914.

Application filed June 20, 1912. Serial No. 704,722.

*To all whom it may concern:*

Be it known that I, JOHN N. JOHNSON, a citizen of the United States, residing at Albuquerque, in the county of Bernalillo and State of New Mexico, have invented certain new and useful Improvements in Self-Leveling Repeating Cameras, of which the following is a full, clear, and exact description.
This invention relates to repeating cameras and has for one of its objects the provision of a combination of means whereby a camera may be accurately and readily sighted and snap shots repeatedly made of an object in motion, by the use of one hand.

In my pending application, Serial No. 669,245, filed Jan. 3, 1912, I have described a suspension device for cameras whereby they may be caused to automatically level themselves through the action of gravity; the said device also providing means for sighting the camera. The present invention goes a step farther in this direction and while preferably utilizing a suspending device similar to that described in my said application, provides in combination therewith mechanism for automatically shifting the film or other light-sensitive medium, and means preferably disposed upon or in the said suspending device adapted to co-act with this substantially automatic film shifting mechanism to cause the actuation of the same when desired. By means of the herein described mechanism, therefore, any occasion calling for a rapid succession of photographs may be met and from one to a dozen snap-shots may be made while the camera is trained upon or aimed at a moving object; the use of but a single hand being required for the several almost simultaneous operations of sustaining the camera, leveling the same, aiming at the object to be photographed, exposing the light-sensitive medium, *e. g.* film, and immediately thereafter shifting or displacing the same preparatory to a new exposure. Attention may also be directed to the fact that the herein described apparatus obviates the liability of exposing the same film twice, although I am aware that attempts have been made to provide means to this particular end. In this connection, however, it may be here stated, that to the best of my knowledge in all of the so-called magazine cameras heretofore produced, the film has not been equidistantly moved preparatory to each succeeding exposure, and one of the features of the present invention is that my novel construction provides invariably equal movements of the film at each successive displacement thereof.

The foregoing and other objects of my invention will be hereinafter referred to and the novel elements and combinations of elements whereby the same may be attained will be more particularly set forth in the claims appended hereto.

In the accompanying drawings which form a part hereof and in which like references designate like parts throughout the several views, I have exemplified certain preferred forms of construction. It is to be understood, however, that these arrangements are merely by way of exemplification since I am aware of various changes and modifications which may be made therein without departing from the spirit of the invention and I hence desire to be limited only by the scope of the said claims.

Referring to the drawings: Figure 1 is a side elevation of a repeating camera constructed in accordance with the principles of my invention, a portion of the camera casing being broken away for purposes of illustration. Fig. 2 is a section of said camera taken on line 2—2 of Fig. 1. Fig. 3 is a fragmentary section of a modified construction of the film actuating mechanism. Fig. 4 is a detail of the shutter actuating plunger. Fig. 5 is a detail section taken on line 5—5 of Fig. 3, showing a preferred construction of the film stop finger. Fig. 6 is a detail of a modification of said finger. Fig. 7 is a side elevation of this modified finger.

It is to be understood that the device in question is applicable to cameras of various descriptions but I have shown it as applied to what is commonly termed a folding camera.

The camera casing has been designated 1 and is provided with the usual hinged front cover 2 carrying the shutter mechanism broadly designated 3 and other associated parts. In the present instance the top 4 of the casing is also hinged at the front edge thereof and carries the rear wall or flap 5 of the casing hinged thereto at the rear edge of said top. This construction of casing has been utilized in the exemplification in question in order to permit of the withdrawal of the film spools upwardly from the casing; but, as stated, I do not desire to be limited in any way to the disposition of parts shown since it is obvious that the film shifting mechanism may be variously positioned in the camera so as to permit of other modes of removing or emplacing the film reels; and the herein described construction is hence merely illustrative, having been chosen on account of its being best adapted to set forth the invention in the drawing.

Referring again to Fig. 1, the top 4 has secured thereto a guide-way 6 within which slides a goose-necked bracket 7; the latter being clamped or secured against inadvertent displacement by a set screw 8, or the like.

The extremity of the bracket has pivotally connected thereto, as at 9, a spindle 10 provided with a suitable catch 11 adapted to retain a sleeve 12 in position thereon. To this sleeve is attached a handle or support 13 adapted to be grasped by the hand of the operator or user of the camera. This handle may be hollow and may have disposed therein a bulb 14; the desideratum in connection with the last mentioned element being that it shall be so disposed as to be readily accessible to the fingers of the hand grasping the support. A tube 15, preferably of flexible rubber, connects the bulb 14 with a cylinder 16, as best shown in Fig. 4. Within this cylinder rides a hollow plunger 17 apertured upon one side thereof, as at 18; suitable means such as a screw 19 in the cylinder wall being provided for holding the plunger against rotation, the side of the plunger being splined as at 20 for the reception of part of this screw. When the bulb 14 is pressed, the air confined therein forces the plunger 17 upwardly until ultimately the port 18, above referred to is registered with a nipple 21 in the side of the cylinder 16, and the compressed air or other fluid thereafter escapes in part at least, through the flexible tube 22 connected to this nipple, emerging therefrom into a cylinder 23 preferably disposed within the camera casing 1, or otherwise suitably housed. The function of the cylinder 23 will be hereinafter referred to. As the plunger 17 is driven upwardly, however, it raises the lever 24 which controls the usual shutter snapping mechanism. Any desired or known construction of shutter and mechanism therefor may be employed and it will suffice for the purpose of the present application to merely designate the controlling lever thereof. In the present instance this lever is composed of two parts, namely the lever proper 25, pivoted as at 26, and a yielding piece 27 which is pivotally connected as at 28 to the part 25; a coiled spring 29 normally holding the piece 27 against the stop 29' carried by part 25. The spring 29 is moderately stiff so that when the plunger 17 presses upwardly against the yielding piece 27, the part 25 will be driven upwardly until the shutter has been snapped. This action occurs before the port 18 registers with the nipple 21. Part 25 having performed its function then comes to rest and the yielding piece is driven upwardly by the plunger 17 against the action of spring 29 until port 18 is registered with its nipple. Thus the pressure upon the bulb 14 invariably first effects the actuation of the shutter insuring a proper exposure of the light-sensitive medium, e. g. film or plate, previous to the admission of pressure fluid to the cylinder 23. The compressed air flowing into this cylinder in the manner above described elevates the plunger 30 therein, the construction of this part being best shown in Fig. 2. Upon the upper extremity of plunger 30 is, in this particular exemplification, a cross bar 31, the free extremity of which carries what may be termed a stop rod or device 32. This rod extends upwardly from the cross bar 31 and may have the upper extremity thereof bent over and around to form a hook 33, as shown in Fig. 5. Said hook is adapted for engagement in the present instance with the upper edge of a sensitized film strip 34; which strip has, at spaced intervals along its edge, notches 35 adapted for the reception of the hooked part of the rod or finger 32. As the film is advanced in the manner hereinafter described, so long as the hook does not encounter a notch, the rod 32 is held in an upper position against the action of a light coiled spring 36, one end of which is secured to the cross bar 31 and the other end of which is secured to the casing 1 in any suitable manner as shown in Fig. 2.

The lower extremity of the rod 32 projects downwardly through an aperture in the casing into a chamber or auxiliary casing 37, whenever the hook is allowed to enter one of the slots 35. When the rod 32 is thus in its lowermost position its lower end is interposed in the path of a revoluble structure or fan 38, which is preferably provided with a plurality of blades or vanes. The spindle 39 of this fan carries a pinion 40 driven by a gear 41 mounted upon a short shaft or spindle 42. The lower extremity of this shaft may be journaled in a bar 43 secured to the bottom of the casing 37 as may also be the spindle 39. The upper end of the shaft 42 projects through the bottom of the casing 1 and carries a clutch-like head 44 adapted for engagement with the splined hub 45 of the roll 46 about which the film 34 is to be wound. The hub 45 and head 44 are adapted to be locked quite firmly together so that when the roll 46 is in place in the camera and the upper hub 47 thereof is held down in place by the lid 4, in the manner hereinafter described, roll 46 will be held against inadvertent lateral displacement and will further be in driving engagement with the head 44.

The shaft 42 carries a small pinion 48 which is in engagement with a gear 49 having the usual ratchet connection 50 with the shaft 51' of a driving spring 51. A winged key or handle 52 may be formed upon or otherwise secured to the outer extremity of shaft 51' whereby the clock-work which drives the film may be wound up.

The fan 38 acts as a regulator or retarding device for restraining excessive speed of the film strip when in motion, so as to insure the successive engagement of the stop device with the notches 35. It is evident, of course, that so long as the device 32 occupies the position in which it is shown in Fig. 2, the clock-work will be held against movement but that if the plunger 30 be lifted by the pressure fluid the vane will be released and the spring 51 will immediately start to wind up the film strip upon the roll 46. The film is delivered from a companion roll 52 which may be substantially identical with the roll 46, being provided with a lower hub 45 and an upper hub 47, the former being adapted for engagement with a clutch head 44', similar to that designated 44, this head, however, being merely an idler and rotating freely upon its stud 53. To the under side of the hinged top or lid 4, is secured a channeled guide 54 adapted for the reception of the upper edge of the film 34; the lower edges of the sides of the guide preferably being flared to facilitate the entrance of the edge of the film therebetween.

Each hub 47 carries a small trunnion 55 and the underside of the lid 4 is correspondingly recessed for the reception of bearings 56 for these trunnions. It is evident that when the top or lid 4 is raised these bearings will be withdrawn from the trunnions as will also be the guide 54 from the film and that, therefore, when the film is substantially completely wound upon one or the other of its rolls it, together with said rolls, may be withdrawn from the camera casing. Auxiliary hooked guides 57 may be provided for steadying the lower edge of the film, said hooks being, if desired, revoluble into the positions indicated in dotted lines in Fig. 2 and therein designated 57'.

The mode of operation of the described device is as follows: The film, preferably covered with light-excluding paper in a well known manner, is introduced into the camera wound upon its roll 52; the hub 45 of this roll being seated in the head 44'. The roll 46 may then be mounted upon its driving head 44 and the extremity of the black paper covering may be attached to the hook 58 carried by the roll 46. In so far as this particular feature is concerned, it *per se*, forms no part of my invention, being well known in the art and has hence been somewhat diagrammatically indicated. The film having thus been properly placed in the camera, the top 4 and rear wall 5 are swung down into place whereupon the trunnions 55 will enter the bearings 56 in the top 4, accurately centering the rolls. Thereafter when the bulb 14 is pressed the shutter will be snapped in the usual fashion, through the elevation of the lever 25, and the continued upward movement of the plunger 17 will admit the compressed air to the cylinder 23, which causes the elevation of the plunger 30 therein and thereby of the stopping device 32. This releases the clock-work whereupon automatically the black paper cover of the roll will be wound onto the roll 46, the first portion of the film being advanced toward its position ready for exposure and the clock-work being automatically stopped when the first notch 35 encounters the hook 33 of the stopping device. Thereafter, of course, the spring 36 pulls the arm 31 and rod 32 together with the plunger 30, downwardly until the lower extremity of said rod has been moved into the path of the rotating fan blades.

It will be understood, of course, that the bulb 14 is but momentarily pressed to effect the actuation of the parts in the manner above described; pressure thereupon being immediately released so that the downward pull of the spring 36 is unopposed by pressure fluid in the cylinder 23. Thereafter, successive snap shots may be taken with great rapidity by merely momentarily and successively pressing the bulb 14; each pressure of this part first effecting a brief exposure of the light-sensitive medium after which the said medium, *c. g.* film, is rapidly shifted through the instrumentality of the clock-work; being brought to a stop at the proper instance by the entrance of the hook 33 into the next succeeding notch 35.

By reason of the construction employed, the film may be invariably shifted equal amounts; a most decided advantage.

I am aware that attempts have been made to effect the automatic shifting or actuation of the film but in the devices of this character with which I am acquainted, the amounts which the film has been shifted have been variable; resulting in either a waste of film, or a superposition of adjacent pictures at the adjoining edges thereof.

It is frequently desirable to take in rapid succession a number of snap shots of a moving object, and it is difficult for the operator to accurately aim the camera repeatedly or continuously while leveling the same or maintaining the same level. It is for this reason that I have provided certain of the parts described in my pending application, above referred to, in connection with the above described apparatus. The handle 13 may, for example, be provided, preferably at the upper portion thereof, with a bar 59 parallel with the sleeve 12; this bar being provided with sights 60 adjacent the respective extremities thereof, so that in order to aim the camera it is merely necessary to aline the object to be photographed with the sights in substantially the same manner that one would aim a revolver. The object may thereby be followed accurately and no heed need be taken as to whether the camera is level or not since owing to the pivotal connection between the stud 10 and sleeve 12, gravity will invariably effect a proper leveling of the apparatus. By virtue of this combination, it is merely necessary to aim at the object to be taken when the camera will automatically level itself and from one to a dozen snap shots may be taken in very rapid succession by pressing the desired number of times upon the bulb 14.

As I have intimated, various changes may be effected in the herein described mechanism without departing from the spirit of the invention, and by way of exemplification, I have illustrated two slight modifications which in certain cases may afford preferred constructions.

In Fig. 3 the actuating spring instead of being directly associated with the gearing or like power transmitting or controlling parts, has been disposed directly within the roll 46'; the driving spring 61 in this instance being helicoidal and having the lower extremity thereof secured to the hub 62 of the film receiving roll, while the upper extremity of this spring is attached to a longitudinally displaceable hub 63 at the upper extremity of the tubular roll 46'. This roll may be flanged as at 64 to retain the hub 63 therein; spring 61 not only serving to rotate the roll but further exercising pressure outwardly upon said hub 63. The upper face of this hub may be recessed as at 65 for the reception of a prong or projection 66 which projects downwardly from the under side of the flange 64. Hub 63 may also be provided with a square shank 67 adapted for reception into a correspondingly shaped recess in the top 4' of the camera casing 1'. The lower hub 62 may have a square recess therein adapted for the reception of a correspondingly shaped part 68 which constitutes the end of a spindle or shaft 69; the latter projecting downwardly through the bottom of the casing 11 into the auxiliary casing 37' and being connected by a suitable train of gears broadly designated 70, with a fan 38 disposed below the stopping rod or device 32. This latter is substantially the same as that previously discussed and is actuated by a plunger 30 within a cylinder 23 in like manner.

It will be understood, of course, that the corresponding roll from which the film is delivered may in its outward appearance resemble the roll 46' just as the roll 52 resembles the roll 46. The mode of operation of this form of the device is as follows: The spring 61 is wound, by depressing the movable hub 63, to release its notch 65 from the prong 66, and thereafter rotating the squared extension 67 until the proper tension has been imparted to the driving spring. The latter is then allowed to press the movable hub outwardly and to rotate the same, if necessary, slightly until it is locked against displacement by the prong 66. The roll may then be introduced into the camera casing, the part 68 of shaft 69 entering the recess in the hub 62, thereby centering the lower extremity of the roll. After the end of the film or its opaque cover has been attached to the roll as in the preceding case, the top 64 is closed down, which causes the squared extension 67 to enter the correspondingly squared recess in the under side of this top, thereby holding the hub 63 against rotation. It will be understood, of course, that the extensions 67 of the respective rolls are properly turned to permit them to enter the recesses in the lid. Further downward movement of the lid or top 4' to the position in which it is shown in Fig. 3 effects a sufficient displacement inwardly of the hub 63 with respect to its roll to disengage the prong 66 and recess 65. The spring 61 is now free to act and it accordingly drives the gearing and thereby the fan 38 until the rod 32 is allowed to descend by the entrance of its hook into the first notch 35 encountered. Thereafter the mode of operation of this form of device is substantially the same as in the preceding case.

In Figs. 6 and 7 I have shown a modification of the hook 33, the rod 32' in this case being provided with a roller 71, the peripheral face of which is provided with a V-shaped groove 72 adapted for engagement with the edge of the film 34'. In this case the film is preferably more deeply notched, as at 35', than in the preceding case, to adapt it for the reception of the roller, but the action of the device is substantially the same as with the hook.

Having thus described my invention, what I claim is:

1. The combination of a film camera having a shutter and film actuating mechanism, with an attachment comprising a support for said camera, a normally free pivotal connection between said camera and said support, and means connected to said support, for controlling the camera shutter and said film actuating mechanism.

2. The combination of a camera having a shutter and mechanism for shifting the light-sensitive medium used in said camera, with an attachment comprising a support for said camera, adapted to be grasped by the hand of the operator, a normally free pivotal connection between said camera and said support, and means, accessible to the hand grasping said support, for controlling the camera shutter and said shifting mechanism.

3. The combination of a camera having a shutter and mechanism for shifting the light-sensitive medium used in said camera, with means including a support adapted to be grasped by the hand of the operator, and a normally free pivotal connection, whereby said camera may be automatically leveled by the action of gravity, means for aiming said camera at an object to be photographed, and means for actuating said shutter and said shifting mechanism, said last mentioned means including an operating part accessible to the hand grasping said support.

4. The combination of a camera having a shutter and mechanism, including an actuating device in which energy is stored, for shifting the light-sensitive medium used in said camera, with an attachment comprising a support for said camera, adapted to be grasped by the hand of the operator, and means, accessible to the hand grasping said support, for controlling said shutter and mechanism.

5. The combination of a camera having a shutter and mechanism, including an actuating device in which energy is stored, for shifting the light-sensitive medium used in said camera, with a normally operative stop for said mechanism, an attachment comprising a support for said camera, adapted to be grasped by the hand of the operator, and means, a part of which is accessible to the hand grasping said support, for first actuating said shutter and thereafter said stop.

6. The combination of a film camera having a shutter and film actuating mechanism including a spring for shifting the film, a stop for said mechanism adapted for engagement with said film, and means operating to first actuate said shutter and thereafter displace said stop.

7. The combination of a film camera having a shutter, a motor for moving the film, two independent pistons pneumatically operated and respectively adapted to actuate the shutter and start the motor and means whereby said pistons will operate in succession.

8. The combination of a film camera having a shutter, a motor for moving the film a detent for the film and motor, a pneumatic cylinder for actuating the shutter a second pneumatic cylinder actuated by the exhaust from the first and adapted to control said detent, substantially as described.

In witness whereof, I subscribe my signature, in the presence of two witnesses.

JOHN N. JOHNSON.

Witnesses:
H. B. RAY,
THOMAS ANDERSON.